United States Patent
Bresch et al.

(10) Patent No.: US 7,599,908 B2
(45) Date of Patent: Oct. 6, 2009

(54) LOGICAL LOCKING FOR JAVA DATA OBJECTS

(75) Inventors: Stefan O. Bresch, Offenburg (DE); Michael E. Watzek, Berlin (DE); Markus J. Kuefer, Heidelberg (DE)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 11/283,208

(22) Filed: Nov. 18, 2005

(65) Prior Publication Data

US 2007/0118523 A1    May 24, 2007

(51) Int. Cl.
*G06F 7/00* (2006.01)

(52) U.S. Cl. .......................................... 707/2

(58) Field of Classification Search ................... 707/2, 707/3, 6, 9, 10, 101, 103
See application file for complete search history.

(56) References Cited

U.S. PATENT DOCUMENTS

| | | | | |
|---|---|---|---|---|
| 6,237,043 | B1 * | 5/2001 | Brown et al. | 719/316 |
| 6,411,983 | B1 * | 6/2002 | Gallop | 718/104 |
| 6,971,102 | B2 * | 11/2005 | Kawachiya et al. | 718/104 |

* cited by examiner

*Primary Examiner*—Charles Rones
*Assistant Examiner*—Fazlul Quader
(74) *Attorney, Agent, or Firm*—Blakely, Sokoloff, Taylor & Zafman LLP

(57) ABSTRACT

Logically locking in a Java Data Object rather than in a transactional context of a data store to separate the process of isolating an object from accessing a data store to which the object is mapped.

20 Claims, 4 Drawing Sheets

LOGICAL LOCKING FOR JAVA DATA OBJECTS

TECHNICAL FIELD

The present invention relates to data store transactions. In particular, the present invention relates to a method and apparatus for logically locking a Java Data Objects transaction.

BACKGROUND

The Java Data Objects (JDOs) specification defines a persistence mechanism in which the Java language is used to persist and retrieve data. The JDO specification refers to any of the JDO specifications including, for example, Java Specification Request (JSR)-000012 entitled, "Java Data Objects." A JDO persistence capable class (or, for ease of reference, a JDO) is an object that can be stored in and retrieved from a persistent data store, for example, a database. Typically, a JDO is mapped to a database table and each field of the JDO is mapped to a column of the database.

Operations on a JDO can be performed as part of a transaction. Transactions are important for maintaining data integrity. They are used to group operations into units of work in an all-or-nothing manner. Transactions have the following qualities, commonly referred to as ACID:

Atomicity—refers to the all-or-nothing property of a transaction. Either every data update in the transaction completes successfully, or they all fail, leaving the data store in its original state. A transaction cannot be only partially successful.

Consistency—each transaction leaves the data store in a consistent state.

Isolation—transactions are isolated from each other. An application reading persistent data in one transaction cannot detect modifications being made to that data in other concurrent uncompleted transactions. Likewise, updates made in one transaction cannot conflict with updates being made in another concurrent transaction. Conflicts are resolved according to whether pessimistic or optimistic transactions are used, as described below.

Durability—the effects of successful transactions are durable; that is, the updates made to persistent data last for the lifetime of the data store.

The JDO standard defines two transaction management strategies: optimistic transactions (an optional JDO feature) and data store transactions (non-optimistic, or "pessimistic", transactions). Pessimistic transactions generally lock the data store records on which they operate, preventing other concurrent transactions from using the same data. This approach guarantees avoiding conflicts between transactions, but consumes a lot of database resources, that is, makes the resources unavailable to other, concurrent, transactions. Additionally, locking records can result in a deadlock, a situation in which two transactions are both waiting for the other to release its locks before completing. The result of a deadlock is data store-dependent, but typically one transaction is rolled back after some specified time out interval, and an exception is thrown.

Optimistic transactions consume fewer resources than pessimistic transactions, at the expense of reliability. With optimistic transactions, an application performs operations on persistent data outside a transaction or before a commit is done using a short local data store, e.g., in memory, transaction. At commit time, persistent data may be verified against the current contents of the data store to ensure that the state of the data store is the same as it was at the beginning of the transaction. In general, optimistic transactions do not lock the data store records, so two transactions might change separate copies of the same persistent information at the same time, and the conflict will not be detected until one of the transactions attempts to commit the persistent data to the data store. At such time, the transaction may realize that another transaction has concurrently modified the same records (usually through a timestamp or versioning system), and will throw an appropriate exception. Optimistic transactions still maintain data integrity; they simply are more likely to fail in concurrent transaction situations.

As indicated above, optimistic transactions execute each operation on the data store as a separate transaction (and possibly a different connection) and data may be retrieved from a cache (a local data store) instead of a database (the data store). The data is available in a cache shared by all persistent managers, so no database access is required. In optimistic transactions, the cache improves application performance by reducing database access. Moreover, there is less lock contention at the database level. Additionally, an application may be able to run with a smaller connection pool as each connection is used for a much shorter time. Applications may use optimistic transactions to avoid holding database locks for a long time.

With pessimistic transactions, the same connection is used for all operations and a commit to the data store is performed only when the JDO transaction commits. Pessimistic transactions are useful when database locks must be maintained during the transaction while optimistic transactions offer better performance through caching and less database lock contention.

Pessimistic transactions operate on persistent data using a data store transaction, that is, between the first data access until commit, there is an active data store transaction. Relying on the transactional data store context means that the data store isolation level will determine whether implicit locks are guaranteed or not upon a certain operation to the data store. Thus, pessimistic transactions may exhibit a very datastore-dependent behaviour, since isolation levels may be implemented differently depending on different databases being accessed. It is not possible, for example, using a structured query language (SQL), to abstract the data store vendor's isolation implementation. Another drawback is that requiring a database lock requires waiting until the lock is granted, which can cause delays in transactions. Furthermore, a lock cannot be acquired prior to performing operations to the data store.

SUMMARY OF THE INVENTION

A method and apparatus to guarantee transactional integrity by separating data store lock management from data store access such that a transaction is executed independent of underlying database isolation levels.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Overview

Figure 1:
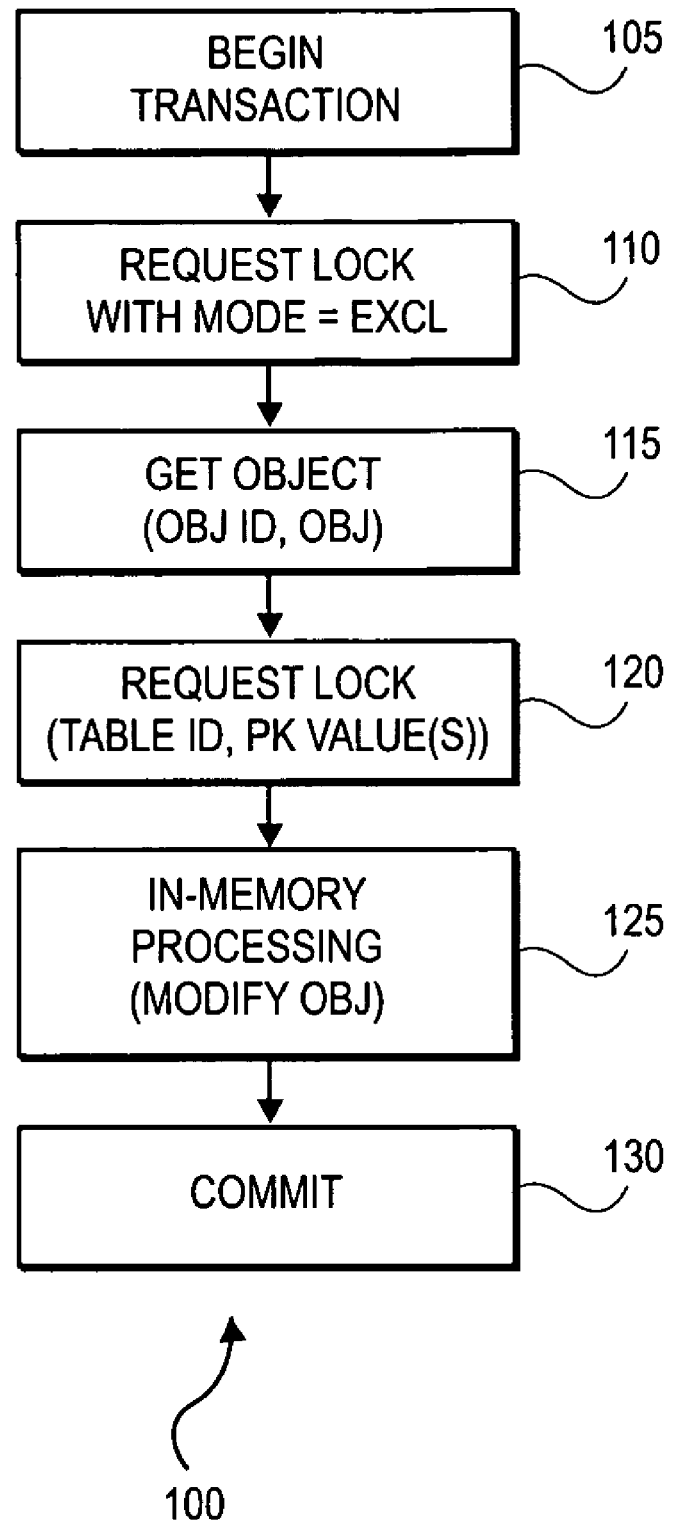
FIG. 1 is a flow diagram of an embodiment of the invention.

In one embodiment of the invention, prior to accessing a data store, a lock is requested from a server that manages locks on a logical level solely. If the logical lock is granted, JDO accesses the data store in accordance with the granted isolation level. The actual data store isolation level is not relevant for isolating concurrent requests on the data store. Therefore, the data store isolation level may be as low as possible. In one embodiment of the invention, JDO is implemented using a table locking application programmatic interface (API). The API is used to acquire logical locks for relational data base structures. In one embodiment of the invention, logical locking is implicitly or explicitly used.

Implicit locking is transparent to the application developer using JDO. The JDO implementation provides adequate locking protocols for optimistic and non-optimistic transaction modes. Explicit locking provides the application developer a higher degree of control in meeting an application's need for concurrency control using features such as timeouts and lock modes. Furthermore, locks can be released explicitly, not just implicitly by committing or rolling back a transaction.

Both, implicit and explicit locking is based on the following principle: on a lock request for a certain PersistenceCapable instance or an Object Identifier (OID), JDO calculates the primary key fields' column names and values and the tables to which they belong. This may be accomplished using a "LockingRequest" that implements the JDO ObjectIdFieldConsumer interface and passing it as a parameter to the PersistenceCapable interface method jdoCopyKeyFieldsFromObjectId(lr, oid)). There is a locking request to the TableLocking API for columns on each table and such column's value. If locks cannot be granted, an exception ("SAPJDOUserException") is thrown.

Logical Locking

Because two different users may simultaneously desire the same data, most database management schemes permit database data to be locked. Traditionally, locking has been "physical" in the sense that the locking is performed by the database itself.

In contrast to physical locking, logical locking is a technique in which locking is controlled at a higher level of abstraction from the physical database(s). For example, according to one type of implementation, the logical locking function is executed upon a "lock server" that controls database locking activity separately from one or more database servers. By controlling locking in a remote fashion relative to the database(s), inefficiencies associated with physical locking may be avoided.

For example, logical locking should allow for better cohesiveness of software that depends upon databases having disparate physical locking characteristics (e.g., where a first database is able to lock a single row and another database is only able to lock a group of rows). The abstract remoteness of logical locking (with respect to physical locking) may also permit items other than database entries to be locked. For example, in an object-oriented environment, data objects having no relationship to any database could conceivably be locked (as well as database entries as described above). Moreover complex locking relationships may be implemented. For example, if an object that represents "an order" is to be locked, all other objects that represent items in the order may be automatically locked in response.

Figure 3:
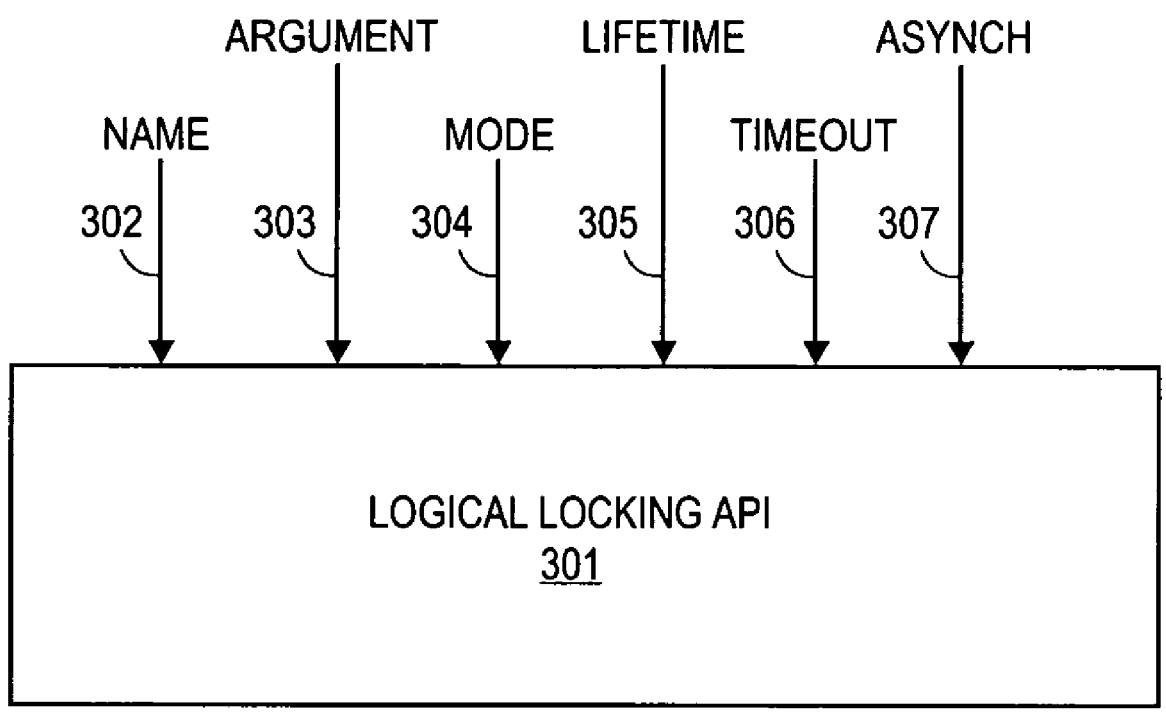
FIG. 3 (prior art) shows a logical locking interface.

FIG. 3 shows a prior art logical locking interface 301. An interface (such as an Application Programmer's Interface (API)) is a defined set of inputs (e.g., commands, parameters, etc.) to a first software function that can be invoked by a second software function so that the second software function can use the first software function. Software interfaces also typically provide for the presentation of output information that is responsive to one or more of the inputs.

As described in more detail below, the information that is to be locked is defined at the logical locking interface 301 along with a request to lock it. The functionality behind the logical locking interface 301 (i.e., the software function that the logical locking interface 301 serves as a user interface for) analyzes each lock request and grants/rejects each lock request for a data item based upon the non-existence/existence of a lock for the same item of data.

The logical locking interface 301 of FIG. 3 has a name input 302 and an argument input 303. The name input 302 identifies "the owner" of the item of data for which a lock is being requested. The argument input 303 identifies the item of data that a lock is being requested for. The functionality behind the locking interface is "name based" in the sense that every data item that is capable of being locked is assumed to belong to an owner having a specific name. For example, if a data field within an object is to be locked, the name input 302 would identify the object and the argument input would identify the data field. In the case of a database row and column pair, the name input 302 would identify the table and the argument input 302 would identify the row and column.

The logical locking interface 301 also has a mode input 304, a lifetime input 305, a timeout input 306, and an asynchronous input 307. Each of these is described in detail immediately below.

The "mode" input 304 can specify any of the following: 1) SHARED for a read lock; 2) EXCLUSIVE for a write lock; 3) EXCLUSIVE_NON_CUMULATIVE for a write lock; 4) OPTIMISTIC for a read lock; or, 5) OPTIMISTIC_TO_EXCLUSIVE for a write lock. A description of each follows immediately below.

If a data item is experiencing a SHARED read lock by a user, other users can be given a read lock to the same data item—but—no user will be given a write lock to the data item. If a data item is experiencing an EXCLUSIVE write lock by a user other users are not given a read lock or a write lock to the data item. Cumulative means that, if a user requests an EXCLUSIVE lock for a data item that the user has already been granted an EXCLUSIVE write lock for, no "exception" will be thrown. NON CUMULATIVE means that an exception will be thrown if a user requests an EXCLUSIVE lock for a data item that the user has already received an EXCLUSIVE lock for.

An exception is a formal rejection to a lock request. Exceptions help to avoid deadlock situations. If two applications request exclusive locks for the same two data items in a different order (e.g., a first application requests item A and then item B and second application first requests item B and then item A), there might be a deadlock of these two applications. Deadlocked applications cannot proceed because, in order to proceed, they each simultaneously need access to the data that is locked by the other. In a deadlock situation, one of these applications could be stopped automatically by the application server or manually by an administrator.

To avoid such a situation, an exception is thrown if a read or write lock request cannot be granted. In response to the receiving of an exception from the logical locking interface (as a response to a read or write lock request), a user may again retry the lock request again after a short time. If the lock is still not granted, the user can retry repeatedly.

According to the OPTIMISTIC read mode, a read of the data is permitted but it is not guaranteed to be consistent with the database because other users may also be reading the same data with the intent to update (i.e., change) it. In OPTIMISTIC read locking, the first user to update the contested data "wins" because only that user is guaranteed to be consistent with the database. As such, the first "winning" user must have "propagated" the original OPTIMISTIC read into an EXCLUSIVE write. The OPTIMISTIC_TO_EXCLUSIVE mode is used for this purpose. That is, the OPTIMISTIC_TO_EXCLUSIVE mode is used when an attempt is made to update a data element that was read optimistically.

The "lifetime" input 305 specifies whether the data item is to be locked for the lifetime of a communication session; or, a transaction (local or distributed). The timeout input 306 specifies the amount of time that the logical locking interface will repeatedly try to lock a data item that, so far, has been locked by another user. Once this foreign lock is released, the lock is granted to the calling user. If the time amount given by the timeout parameter has been exceeded and the lock has not been granted to the calling user, an exception will be thrown. Therefore, a lock request call to the logical locking interface blocks the calling user until the lock is granted or the timeout time has been exceeded.

Although only locking has been discussed above, treatment as to the manner in which data items are "unlocked" can also be specified through the interface 301. According to one implementation, if the asynchronous input 307 is set to "false", locks for a transaction or user session are released synchronously (e.g., a lock server blocks until all locks are released). By asserting the asynchronous input 307 to "true" asynchronous releases are attempted (but cannot be guaranteed).

Because the logical locking function behind the interface 301 is geared toward something more than traditional physical locking, detrimental effects may result if the logical locking function is used to lock an entire row of data. For example, if different users specify the row columns according to different syntaxes, the functionality behind the interface 301 might miss the conflict and permit overlapping requests to access the same data.

Table Locking

Figure 4:
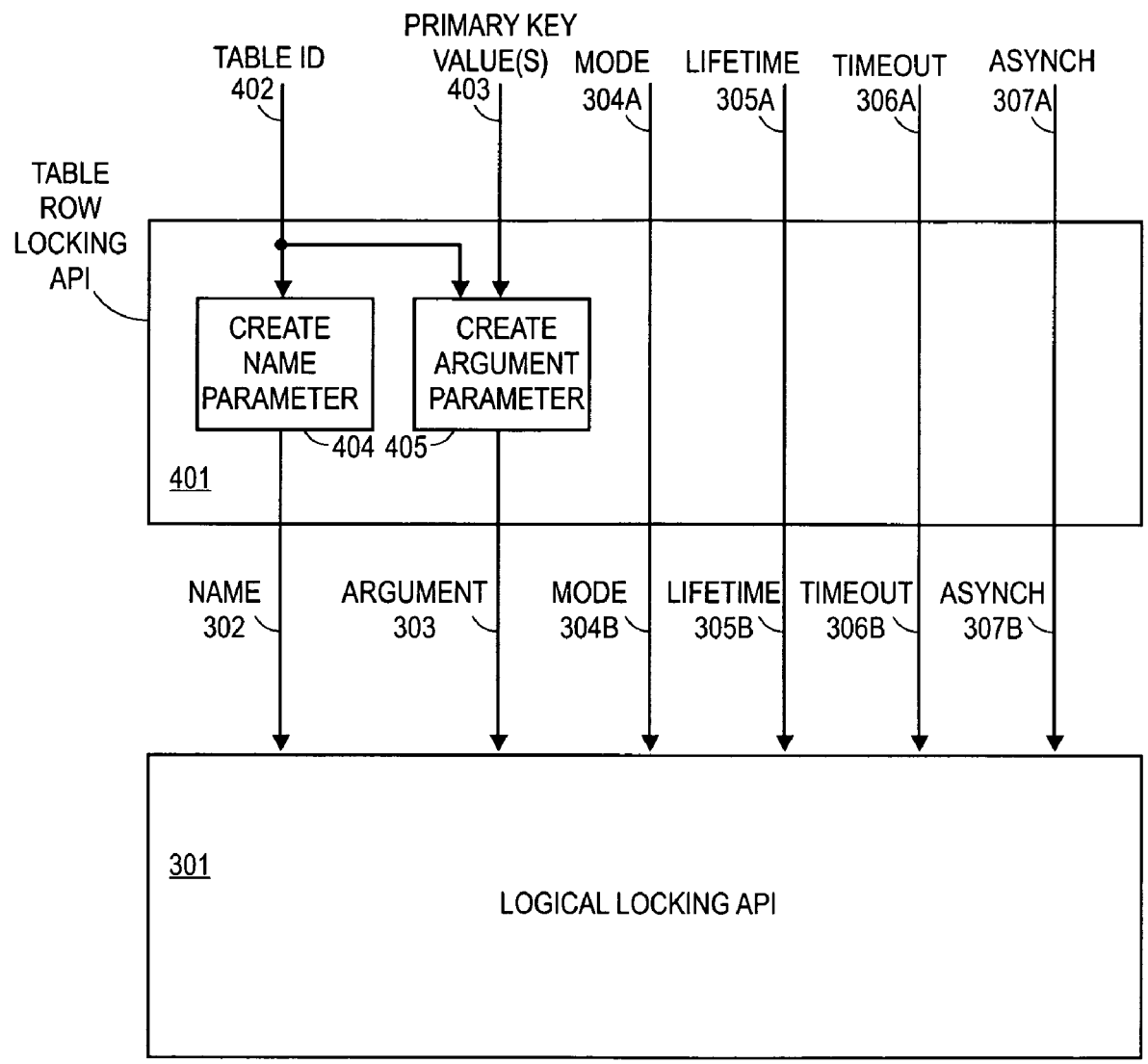
FIG. 4 shows an interface for generating a database table row lock request through a logical locking interface

Formatting requests to lock an entire row of a database table into a standard format for submission to a logical locking interface helps the functionality behind the logical locking interface service such requests. FIG. 4 shows an architecture in which another interface (the table row locking interface) 401 used to format requests to lock an entire row of database data is positioned "on top of" a logical locking interface 301.

The table row locking interface 401 formats user requests to lock a row of data from a database table into a standard format that allows the functionality behind the logical locking interface 301 to better handle such requests. According to the stacked interface structure observed in FIG. 4, the table row locking interface 401 also has mode 304a, lifetime 305a, timeout 306a and asynchronous 307a inputs. Moreover, the embodiment of FIG. 4 shows that these inputs 304a through 307a are respective "straight-throughs" to the mode 304b, lifetime 305b, timeout 306b and asynchronous 307b inputs of the logical locking interface 301. That is, an input parameter received at any of inputs 304a through 307a of the table row locking interface is simply passed through to inputs 304b through 307b, respectively, of the logical locking interface 301.

In an embodiment, the mode 304b, lifetime 305b, timeout 306b and asynchronous 307b inputs of the logical locking interface 301 of FIG. 4 are the same as those described above with respect to FIG. 3. As such, the structure of FIG. 4 indicates that the table row locking interface 401 accepts inputs for (and the functionality behind the table row locking interface 401 supports) the same functions described with respect to inputs 304 through 307 of FIG. 3.

The table row locking interface 401 also formats 404 an identification of the table 402 having the row to be locked into a name parameter input 302 for presentation to the logical locking interface 301; and, formats 405 primary key values 403 that identify the row to be locked into an argument parameter input 303 for presentation to the logical locking interface.

Pessimistic Locking

With respect to FIG. 1, an embodiment of the invention provides for explicit pessimistic logical locking 100 as described below. At 105, a transaction begins, and immediately a call is made at 110 to the logical locking interface to request to lock from the lock server with mode=EXCLUSIVE. The object to be accessed is identified at 115, specifying the name of the object and/or an identifier of the object. In one embodiment of the invention, JDO calculates the table, and the primary key column names and the rows in the table to lock, and then a locking request via the table locking API is made at 120 with mode=SHARED to lock the columns in the table based on the object identifier and the particular rows based on the primary key value(s). In one embodiment, the rows are identified by the primary keys that are calculated based on the object identifier(s). The object may then be accessed and modified at 125. When the transaction is complete, the transaction is committed at 130, and the modified object flushed to the data store. The logical lock can be released either implicitly, as part of the commit operation performed by JDO, or explicitly by the application by requesting an unlock just prior to commit. Alternatively, if an error is detected that would compromise the integrity or consistency of the modified data, a rollback may be performed at 130 to erase the transaction.

Optimistic Locking

Figure 2:
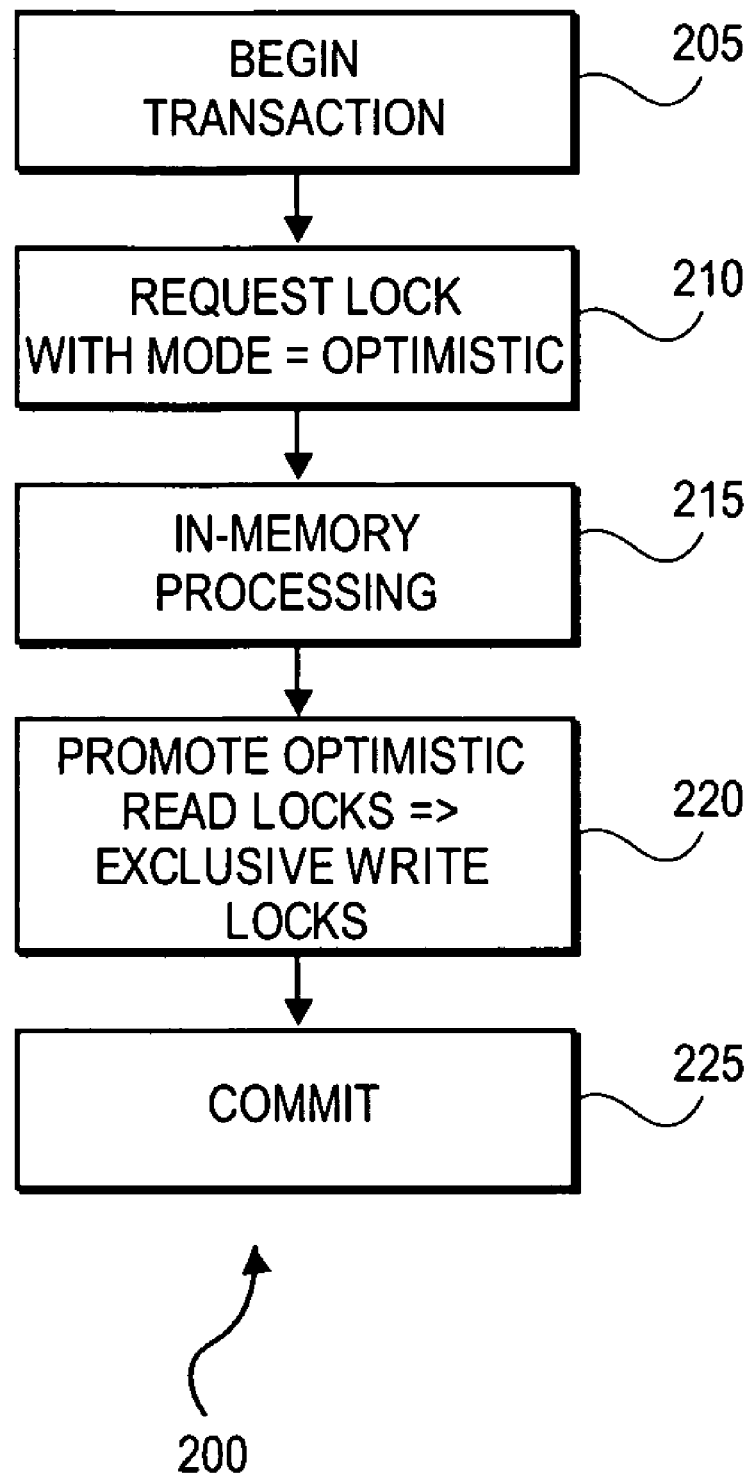
FIG. 2 is a flow diagram of an embodiment of the invention.

In accordance with FIG. 2, an embodiment of the invention provides for optimistic locking in an implementation of JDO. The invention uses an optimistic locking protocol provided by the lock server instead of that provided by the transactional context of an underlying database. An embodiment of the invention requests an optimistic read lock at 210 shortly before persistence objects are fetched from the data store. In-memory processing takes place at 215. Before modified objects are flushed to the data store (during a callback of the container to the JDO implementation), the invention promotes the affected optimistic read locks to exclusive write locks at 220. If the promotion fails for an object, an optimistic verification exception is raised and the short data store transaction is rolled back. In one embodiment of the invention, this method is applied to objects that are made transactional as well. Finally, at 225, the transaction is committed to the data store.

CONCLUSION

It is important to emphasize that the processes described above may be executed upon a computing system such as a server. The server may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, to the extent possible, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable storage media suitable for storing electronic instructions. Program code may also be downloaded from a remote computer (e.g., a server) to a requesting computer (e.g., a client) by way of data signals embodied in a propagation or machine-readable communication medium (e.g., via a communication link (e.g., a network connection)).

A computing system can execute program code stored by an article of manufacture. The applicable article of manufacture may include one or more fixed components (such as a hard disk drive or memory) and/or various movable components such as a CD ROM, a compact disc, a magnetic tape, etc. In order to execute the program code, typically instructions of the program code are loaded into the Random Access Memory (RAM); and, the processing core then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method for performing logical locking, the method comprising:

receiving a request to logically exclusively lock a data object stored in one or more rows of a table in a data store, the data object having an object identifier;

determining the one or more rows in the table in the data store in which the data object is stored;

formatting the request to logically exclusively lock the data object into a standardized request to logically lock columns and the one or more rows in the table in which the data object is determined to be stored, the columns in the table based on the object identifier of the data object, wherein formatting the request into the standardized request includes:

formatting an identification of the table having the one or more rows to be locked into a name parameter of the standardized request;

formatting primary key values that identify the one or more rows to be locked into an argument parameter of the standardized request; and formatting a mode value that indicates a shared read lock of the one or more rows to be locked into a mode parameter of the standardized request;

retrieving a copy of the one or more rows in the table in which the data object is determined to be stored from the table into a memory responsive to the standardized request;

modifying the copy of the one or more rows in memory; and committing the modified copy of the one or more rows in memory to the table in the data store.

2. The method of claim 1, wherein formatting the request to logically exclusively lock the data object into the standardized request is performed by a table row locking interface for presentation to a logical lock server.

3. The method of claim 1, farther comprising unlocking the exclusive lock on the data object after committing the modified copy of the one or more rows in memory to the table in the data store.

4. The method of claim 3, wherein the unlocking is implicitly performed by an application container via a Java Data Objects layer.

5. The method of claim 3, wherein the unlocking is explicitly performed by an application deployed in an application container.

6. The method of claim 2, wherein the logical lock sewer receives the standardized request to logically lock the one or more rows in which the data object is stored from the table row locking interface to the logical lock server.

7. A computer-implemented method for performing logical locking, the method comprising:

initiating a transaction affecting a data object stored in one or more rows of a table in a data store, the data object having an object identifier;

receiving a request for a logical optimistic read lock on the data object;

determining the one or more rows in the table in the data store in which the data object is stored;

formatting the request for the logical optimistic read lock on the data object into a standardized request to logically lock columns and the one or more rows in the table in which the data object is determined to be stored, the columns in the table based on the object identifier of the data object, wherein formatting the request into the standardized request includes:

formatting an identification of the table having the one or more rows to be locked into a name parameter of the standardized request;

formatting primary key values that identify the one or more rows to be locked into an argument parameter of the standardized request; and formatting a mode value that indicates an optimistic read lock of the one or more rows to be locked into a mode parameter of the standardized request;

retrieving a copy of the one or more rows in the table in which the data object is determined to be stored from the table into a memory responsive to the standardized request;

modifying the copy of the one or more rows in memory;

promoting the optimistic read lock of the one or more rows to an exclusive write lock;

committing the modified copy of the one or more rows in memory to the table in the data store; and ending the transaction.

8. The method of claim 7, wherein the request is received by a lock sewer.

9. The method of claim 8, wherein the request is received by the lock server via a table row locking interface, the table row locking interface performing formatting the request for the logical optimistic read lock on the data object into the standardized request to logically lock columns and the one or more rows in the table in which the data object is determined to be stored.

10. The method of claim 7, wherein if the promoting the optimistic read lock to the exclusive write lock fails, then throwing an optimistic verification exception and rolling back the transaction.

11. An article of manufacture comprising:

a machine-readable storage medium providing instructions that, when executed by a processor, cause the processor to receive a request to logically exclusively lock a data object stored in one or more rows of a table in a data store, the data object having an object identifier;

determine the one or more rows in the table in the data store in which the data object is stored;

format the request to logically exclusively lock the data object into a standardized request to logically lock columns and the one or more rows in the table in which the data object is determined to be stored, the columns in the table based on the object identifier of the data object, wherein to format the request into the standardized request includes:

format an identification of the table having the one or more rows to be locked into a name parameter of the standardized request;

format primary key values that identify the one or more rows to be locked into an argument parameter of the standardized request; and format a mode value that indicates a shared read lock of the one or more rows to be locked into a mode parameter of the standardized request;

retrieve a copy of the one or more rows in the table in which the data object is determined to be stored from the table in the data store into a memory responsive to the standardized request;

modify the copy of the one or more rows in memory; and commit the modified copy of the one or more rows in memory to the table in the data store.

12. The article of manufacture of claim 11, wherein the instruction to format the request to logically exclusively lock the data object into the standardized request is performed by a table row locking interface for presentation to a logical lock server.

13. The article of manufacture of claim 11, further comprising instructions that unlock the exclusive lock on the data object after the commit of the modified copy of the one or more rows in memory to the table in the data store.

14. The article of manufacture of claim 13, wherein the unlock is implicitly performed by an application container via a Java Data Objects layer.

15. The article of manufacture of claim 13, wherein the unlock is explicitly performed by an application deployed in an application container.

16. The article of manufacture of claim 12, wherein a logical lock server receives the standardized request to logically lock the one or more rows in which the data object is stored from the table row locking interface to the logical lock sewer.

17. An article of manufacture comprising:

an machine-readable storage medium providing instructions that, when executed by a processor, cause the processor to initiate a transaction affecting a data object stored in one or more rows of a table in a data store, the data object having an object identifier;

receive a request for a logical optimistic read lock on the data object;

determine the one or more rows in the table in the data store in which the data object is stored;

format the request for the logical optimistic read lock on the data object into a standardized request to logically lock columns and the one or more rows in the table in which the data object is determined to be stored, the columns in the table based on the object identifier of the data object, wherein to format the request into the standardized request includes:

format an identification of the table having the one or more rows to be locked into a name parameter of the standardized request;

format primary key values that identify the one or more rows to be locked into an argument parameter of the standardized request; and format a mode value that indicates an optimistic read lock of the one or more rows to be locked into a mode parameter of the standardized request;

retrieve a copy of the one or more rows in the table in which the data object is determined to be stored from the table into a memory responsive to the standardized request;

modify the copy of the one or more rows in memory;

promote the optimistic read lock of the one or more rows to an exclusive write lock;

commit the modified copy of the one or more rows in memory to the table in the data store; and end the transaction.

18. The article of manufacture of claim 17, wherein the request is received by a lock server.

19. The article of manufacture of claim 18, wherein the request is received by the lock server via a table row locking interface, the table row locking interface performing the instruction to format the request for the logical optimistic read lock on the data object into the standardized request to logically lock columns and the one or more rows in the table in which the data object is determined to be stored.

20. The article of manufacture of claim 17, wherein the instructions further, if the promote from the optimistic read lock to the exclusive write lock fails, throw an optimistic verification exception and roll back the transaction.

* * * * *